United States Patent [19]
Duncan

[11] Patent Number: 5,701,450
[45] Date of Patent: Dec. 23, 1997

[54] SYSTEM INCLUDING ATA SEQUENCER MICROPROCESSOR WHICH EXECUTES SEQUENCER INSTRUCTIONS TO HANDLE PLURALITY OF REAL-TIME EVENTS ALLOWING TO PERFORM ALL OPERATIONS WITHOUT LOCAL MICROPROCESSOR INTERVENTION

[75] Inventor: Kathleen Anne Duncan, Santa Cruz, Calif.

[73] Assignee: Seagate Technology, Inc., Scotts Valley, Calif.

[21] Appl. No.: 639,243

[22] Filed: Apr. 22, 1996

Related U.S. Application Data

[63] Continuation of Ser. No. 202,391, Feb. 25, 1994, abandoned.
[51] Int. Cl.$^6$ .................. G06F 9/44; G06F 13/12
[52] U.S. Cl. ............. 395/595; 395/856; 395/200.03; 395/445; 395/580
[58] Field of Search ................. 395/445, 856, 395/200.01, 200.03, 580, 595

[56] References Cited

U.S. PATENT DOCUMENTS

| | | | |
|---|---|---|---|
| 3,919,483 | 11/1975 | Gindi et al. | 179/15 AL |
| 4,536,836 | 8/1985 | Dodd et al. | 364/200 |
| 4,549,262 | 10/1985 | Chung et al. | 364/200 |
| 4,649,474 | 3/1987 | Ambrosius, III et al. | 364/200 |
| 4,722,051 | 1/1988 | Chattopadhya | 364/200 |
| 4,794,517 | 12/1988 | Jones et al. | 364/200 |
| 5,081,574 | 1/1992 | Larsen et al. | 395/375 |
| 5,394,529 | 2/1995 | Brown, III et al. | 395/375 |

OTHER PUBLICATIONS

Data Sheet, *Cirrus Logic*, "CL-SH 260, Integrated PC XT-AT™ Disk Controller", May, 1989, pp. 1–84.
"AIC-6160A, Integrated PC AT Mass Storage Controller, *Advance Copy*", Adaptec.

*Primary Examiner*—Thomas C. Lee
*Assistant Examiner*—Rehana Perveen
*Attorney, Agent, or Firm*—Flehr Hohbach Test Albritton & Herbert LLP

[57] ABSTRACT

A modular ATA hard disc controller includes a small on-chip ATA sequencer microprocessor having on-chip dedicated hardware to manage real-time events without host CPU intervention, without substantially degrading cost/performance for the resultant controller chip. To conserve IC chip space, a small instruction set for the on-chip ATA sequencer microprocessor is provided, wherein branch instructions are avoided. The instruction set causes execution only for a given data transfer direction (read or write), or executes always. On-chip task registers are coupled directly to the ATA sequencer microprocessor. This architecture minimizes host CPU bottlenecking by decoupling the host CPU from real-time events occurring on the AT bus, and by decoupling the local processor from the task registers. The resultant controller automatically receipts for all write data, handles task file updating and intersector handshaking, and host microprocessor queueing of the address of the next disc data block to be transferred.

40 Claims, 5 Drawing Sheets

| 7 | 6 | 5 | 4 | 3 | 2 | 1 | 0 |
|---|---|---|---|---|---|---|---|
| CONDITION | | TYPE | | SPECIAL OPCODES | | | |
| X | X | 0 | 0 | SO3 | SO2 | SO1 | SO0 |

FIG. 5A

| 7 | 6 | 5 | 4 | 3 | 2 | 1 | 0 |
|---|---|---|---|---|---|---|---|
| CONDITION | | TYPE | | CLEAR OPCODES | | | |
| X | X | 0 | 1 | C3 | C2 | C1 | C0 |

FIG. 5B

| 7 | 6 | 5 | 4 | 3 | 2 | 1 | 0 |
|---|---|---|---|---|---|---|---|
| CONDITION | | TYPE | | SET OPCODES | | | |
| X | X | 1 | 0 | C3 | C2 | C1 | C0 |

FIG. 5C

| 7 | 6 | 5 | 4 | 3 | 2 | 1 | 0 |
|---|---|---|---|---|---|---|---|
| CONDITION | | TYPE | | COMPLEX OPCODES | | | |
| X | X | 1 | 1 | CO3 | CO2 | CO1 | CO0 |

FIG. 5D

| 7 | 6 | 5 | 4 | 3 | 2 | 1 | 0 |
|---|---|---|---|---|---|---|---|
| WAIT OPCODE | | | | WAIT CONDITION | | | |
| 1 | 1 | 0 | 0 | WC3 | WC2 | WC1 | WC0 |

FIG. 5E

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| BRANCH OPCODE | | | BRANCH CONDITION | | | | | N/U | BRANCH ADDRESS | | | | | | |
| 1 | 1 | 1 | BC4 | BC3 | BC2 | BC1 | BC0 | X | BA6 | BA5 | BA4 | BA3 | BA2 | BA1 | BA0 |

FIG. 5F

SYSTEM INCLUDING ATA SEQUENCER MICROPROCESSOR WHICH EXECUTES SEQUENCER INSTRUCTIONS TO HANDLE PLURALITY OF REAL-TIME EVENTS ALLOWING TO PERFORM ALL OPERATIONS WITHOUT LOCAL MICROPROCESSOR INTERVENTION

This is a continuation of application Ser. No. 08/202,391 filed Feb. 25, 1994 now abandoned.

FIELD OF THE INVENTION

This invention relates generally to controllers for a computer hard disc, and more specifically to an improved AT attachment ("ATA")/integrated device electronics ("IDE") hard disc controller sequencer.

BACKGROUND OF THE INVENTION

Computers typically include a central processing unit ("CPU") and a persistent storage device such as a hard disc drive storage unit. Typically the hard disc drive unit includes one or more discs, each having two storage surfaces whereon concentric tracks and storage sectors are defined. The collection of all tracks having the same track number on the various surfaces defines a storage cylinder. The hard disc drive unit includes a read/write head for accessing data to be stored or read from each disc storage surface.

A hard disc controller is coupled between the CPU and the hard disc to control the flow of data between the CPU and hard disc. The controller also controls positioning of the hard disc read/write heads for accessing desired hard disc sectors. The data required by the CPU to be stored on the disc memory is typically first stored in a buffer memory. The hard disc controller reads the buffer memory and writes the data to the hard disc at a storage location specified by the CPU.

An industry-accepted AT Attachment interface ("ATA") standard defines the interface between a host processor ("CPU") communicating over a host bus (e.g., an AT™ bus) with the controller for a hard disc drive storage unit. The ATA interface includes definitions for a set of registers, a standardized 40-pin connector, and associated interface signals. The defined register set includes a command register containing the command code being sent to the disc drive, a data register for transferring data blocks between the controller buffer and the host processor, registers concerned with the relevant disc drive address, sector and read/write head, and registers containing status information including error posting. The ATA interface is sometimes also referred to as an intelligent or integrated drive electronics ("IDE").

The physical geometry of a hard disc surface refers to the disc drive configuration, including the number of tracks, sectors per track, and heads. Due to limitations in some ATA host system software, not all disc drive physical geometries are supported. Consequently, to promote compatibility with such an ATA host systems, the disc drive software often emulates a given physical geometry. Such emulated geometry is termed logical disc geometry to differentiate it from the physical or actual geometry of a disc drive.

Upon command from the host processor, data to or from the host computer memory are parallel transferred over an 8 or 16 line bus to buffer memory within the controller. The controller then performs all operations necessary to properly write the data to, or read data from, the hard disc media. Data read from the media is stored in the controller buffer pending transfer to the host memory, and data transferred from the host memory is stored in the controller buffer before being written to the storage media.

With reference to FIG. 1A, early prior art hard disc controllers 2 interfaced to the CPU system bus 10 via an ATA input/output bus. Western Digital WD1003 or WD42C22 integrated circuits represent a typical implementation of a prior art controller 2. The operation of such controllers is known to those skilled in the relevant art, and may be found, for example, in U.S. Pat. No. 4,549,262 to Chung, et al. (1985).

The controller 2 required the services of a microprocessor, which typically was the CPU 4 within the host computer. The controller 2 also communicated with a disc buffer memory 6 that held at least two sectors worth of data to be written to or read from the hard disc 8. One sector of information from host CPU 4 was first written into the buffer memory 6 and was then written onto the hard disc 8 at a CPU-specified location, via the CPU system bus 10 and controller 2. Similarly, information read from a specified hard disc storage location was written, via the controller, into the buffer memory and then accessed by the CPU. A servo unit 7 associated with the disc drive unit 8 repositioned the read/write heads upon command from the controller 2.

Bottlenecking, resulting from the relatively slow data rates associated with the hard disc input/output, was minimized by operating the buffer memory 6 in this ping-pong fashion. One sector magnitude of buffer contents could be read relatively rapidly by the CPU, while the next sector's contents were written relatively slowly from the disc media into the remaining buffer storage space.

The AT attachment ("ATA") interface protocol requires certain real-time CPU-controller interface functions to be performed by the controller unit 2. For example, the ATA interface protocol requires an intersector handshake at each sector boundary on the hard disc, whereby the status of a previous sector must be posted before reading or writing from the next sector. Further, so-called task file registers associated with the system CPU 4 require updating to indicate the identity of the sector currently being transferred. Finally, all write data must be automatically receipted for.

In the prior art configuration of FIG. 1A, controller 2 relied upon the system CPU 4 for these, and other, real time functions. Unfortunately, CPU 4's ability to do actual processing and execution of the application program being run suffered performance degradation. Further, real-time response was also degraded because the system CPU 4 was remote from the controller. In addition, because the system CPU was required to provide real-time responses to service the hard disc, it was difficult to write the necessary microcode, especially with respect to instructions branching between read and write.

FIG. 1B depicts a newer, more modular and more intelligent disc drive unit 12, according to the prior art. An ATA adapter 11 provides decode and electrical buffering between the CPU system bus 10 and interfaces via a 40 conductor ATA cable with unit 12. Unit 12 includes a hard disc controller unit 13, comprising ATA interface and disc control units, an off-chip 16-bit wide local processor 14 having associated read only memory ("ROM"), an off-chip dynamic random access memory ("DRAM") buffer 18, disc servo circuitry 7 and a hard disc drive 8.

The configuration of FIG. 1B provides several advantages over that of FIG. 1A. Substantial control activities are assigned from the host computer main CPU 4 to local CPU 14, and the host computer main CPU 4 no longer has direct access to the disc buffer memory (or cache) 18. Typical prior art implementations of controller 13 include the Cirrus 260, 265 and the Adaptek 6190 series of integrated circuits.

The controller-CPU interface depicted in FIG. 1B is primarily a block-interface. The system CPU 4 requests a block of data to or from the controller 12, but without specifying or controlling where or in what form that data shall be stored in the DRAM buffer memory 18, or on the hard disc storage media 8.

Because less system control over hard disc operation is required in the configuration of FIG. 1B, the host computer main CPU 4 is less apt to bottleneck due to excess real time supervisory chores. Further, the computational power provided by local CPU 14 permits correcting of disc data errors, and reading ahead from the disc, in anticipation that adjacent data may soon be required by the host computer CPU 4.

However the local CPU 14 itself can bottleneck while processing real-time interface handshaking, data correct, read ahead, and servo chores. For example, CPU 14 is typically designed to handle the operational events of disc drive 8 through an interrupt process. As such, CPU 14 timing can be critical when responding to real-time events, especially for modern rapid access time hard disc drive units 8.

Further, the microcode 16 associated with local CPU 14 remains relatively complex as the local CPU 14 is required to serve numerous real time events, and must branch between read and write data paths. Implementing the configuration of FIG. 1B requires a relatively powerful processor, which adds to the cost of the off-chip local CPU 14.

In the configurations of FIG. 1A and FIG. 1B, the hard disc controller tends not to be modular due to the required communications paths between the CPU 4, the CPU bus 10 and the buffer memory 6. As a result, absent modification of the interface, it was not possible to relocate a given hard disc controller from one system for use in a different type system. Further, in the event changes are made in the ATA interface standard, it is necessary to change the hardware implementation of prior art hard disc controller units.

What is needed is an ATA hard disc controller that is modular, and that incorporates a small on-chip microprocessor without substantially degrading cost/performance for the resultant controller chip. To minimize bottlenecking of the host CPU, the controller architecture should decouple the host CPU from real-time events occurring on the AT bus. Further, the controller should decouple the local processor from the task registers, which preferably are coupled to an ATA sequencer. Preferably such decoupling should be implemented by providing an ATA controller that includes on-chip dedicated hardware to manage such real-time events without host CPU intervention.

Because minimization of integrated circuit ("IC") chip area dictates that the on-chip ATA sequencer microprocessor be small, a small instruction set must be utilized. However, such instruction set should automatically receipt for all write data, handle task file updating and intersector handshaking, and permit the host microprocessor to queue up the address of the next disc data block to be transferred. Finally, a hard disc controller sequencer should accommodate changes in the applicable ATA interface standard without requiring substantial hardware modification to the sequencer itself.

The present invention discloses such a controller and controller instruction set.

SUMMARY OF THE PRESENT INVENTION

The present invention implements an ATA interface controller with a relatively simple and primitive on-chip ATA sequencer microprocessor. Applicant's microprocessor segregates real-time interface functions such as automatically receipting for all write data, updating task file registers, and intersector handshaking.

To conserve IC chip space, the microprocessor instruction set is implemented to execute only for a given direction of data transfer, e.g., "read" condition or "write" condition, or to execute always. Because this eliminates branch instructions, the space required to store the instruction set is reduced, and the design and performance of the ATA sequencer microcontroller program is simplified.

The ATA sequencer microprocessor is directly coupled to the task registers, whose correct status is controlled by the microprocessor instruction set. In this fashion, the host external microprocessor is advantageously decoupled from real-time events occurring on the AT bus, thus reducing supervisory overhead and enhancing performance of the host microprocessor.

Other features and advantages of the invention will appear from the following description in which the preferred embodiments have been set forth in detail, in conjunction with the accompanying drawings.

BRIEF DESCRIPTION OF THE DRAWINGS

FIG. 5A depicts ATA sequencer special instructions, according to the present invention;

FIG. 5B depicts ATA sequencer clear flag instructions, according to the present invention;

FIG. 5C depicts ATA sequencer set flag instructions, according to the present invention;

FIG. 5D depicts ATA sequencer complex instructions, according to the present invention;

FIG. 5E depicts ATA sequencer wait instructions, according to the present invention; and FIG. 5F depicts ATA sequencer branch instructions, according to the present invention.

DETAILED DESCRIPTION OF THE PREFERRED EMBODIMENT

The configuration of the preferred embodiment will first be described with reference to FIG. 2, wherein an ATA host system 41 communicates with a hard disc drive system 41 and an ATA controller 20, according to the present invention.

Figure 2:
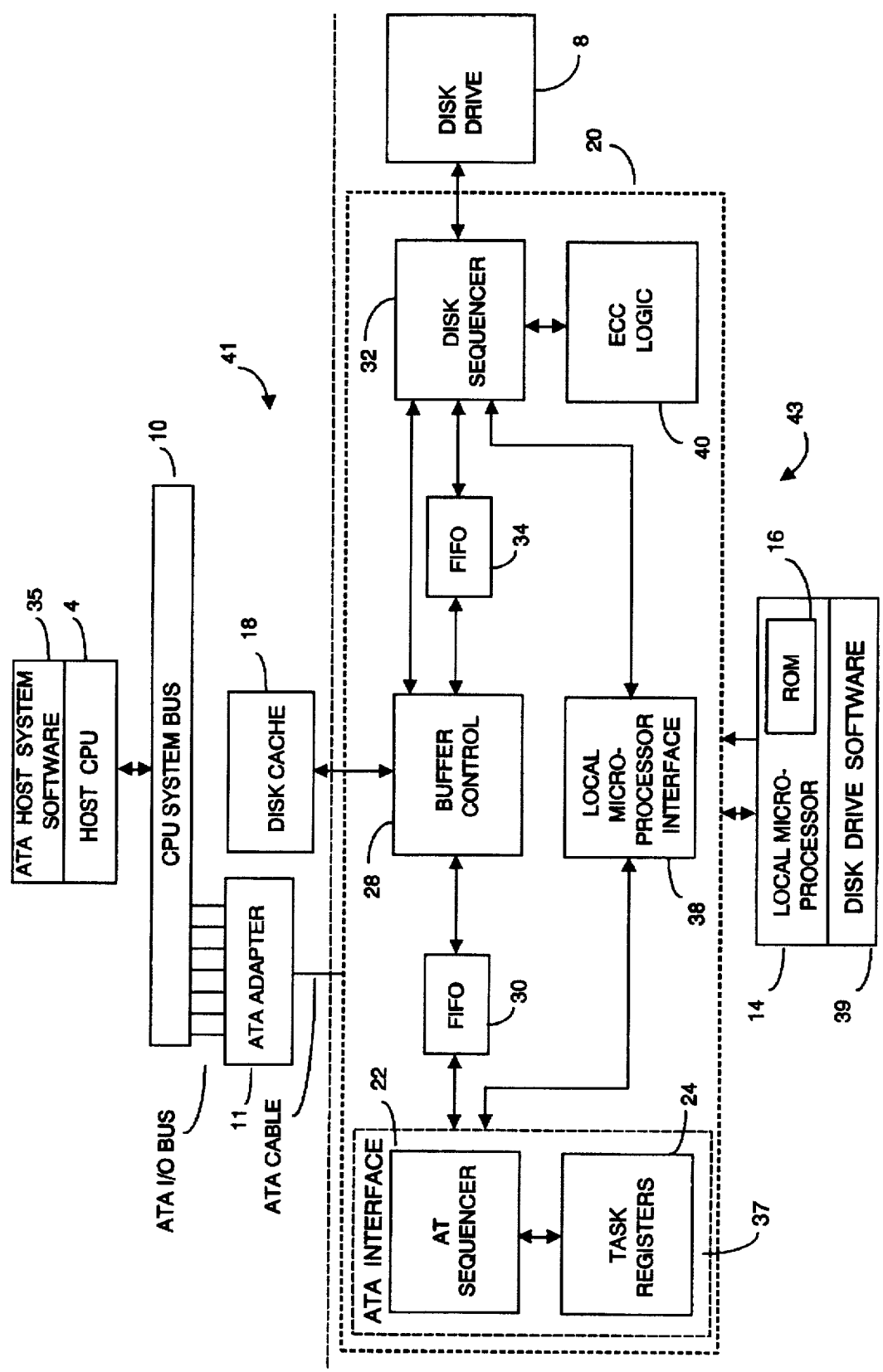
FIG. 2 depicts an ATA host system, and a hard disc drive system including an ATA interface, according to the present invention.

In FIG. 2, an AT interface 37 includes an AT sequencer 22 and task registers 24, preferably implemented on a common IC chip. The AT sequencer 22 provides interfacing between ATA host system 41, which includes a host CPU 4, and the hard disc drive system 41.

The host CPU 4 executes ATA host software 35 and communicates with hard disc drive system 41 via a CPU system bus 10 and ATA adapter 11 and associated ATA cable. The disc drive system 41 includes a disc drive 8, an ATA interface controller 20 that is preferably fabricated as a single IC, a local microprocessor 14 that executes disc drive software 39, and a disc cache 18 to improve access time. In FIG. 2, all data coming from or going to the disc drive 8 does so via disc cache 18. The ATA interface controller 20 functions primarily to interface with host CPU 4 under supervision of disc drive software 39.

The communication protocol between an ATA host system and an ATA interface is defined by a Common Access Committee ("CAM") ATA Interface Specification. Applicant refers to and incorporates by reference herein said CAM ATA Interface Specification.

Section 10.1 of the CAM ATA Specification defines the "handshake" between an ATA host system and an ATA interface, and the data transfer protocol. The CAM ATA Specification also requires an "intersector handshake" at each hard disc surface sector boundary, whereby the status of a previous sector must be posted before reading or writing from the next sector. Further, the CAM ATA Specification dictates that after the host system software issues a write command, the ATA interface allows only 400 ns wherein the data to be written must be accepted.

A so-called ATA task file is defined by the CAM ATA Interface Specification to provide a communication protocol between an ATA host system and the ATA interface. In the present invention, the ATA interface controller 20 includes a set of task file registers 24 that provide hardware implementation of the ATA task file.

These task file registers specify the logical disc "address" to be read/written by the ATA Host system, and reflect the logical disc address of the sector currently being transferred to or from the ATA Host system 41.

a) sector number register for indicating starting sector on the track to be transmitted;

b) sector count register for indicating how many sectors to be transferred;

c) drive/head register for indicating the head to be accessed;

d) cylinder high register for indicating high byte of cylinder number address;

e) cylinder low register for indicating high byte of cylinder number address;

f) command register for receiving and storing the command from the ATA host system; and g) status register for indicating operating status of the disc drive.

To be compatible with the protocol defined by the CAM ATA Specification, the task file registers 24 must be updated during disc drive data transfer operations. As such, the ATA host system software 35 must access tasks file registers 24 to monitor data transfer and to associate errors reported by disc drive 8 with respect to particular sectors. Disc drive software 39 must also access these tasks file registers in supervising disc drive 8 in executing ATA host system commands, and in directing the transfer of data to and from disc cache 18 and the rotating media storage surfaces.

Table I is a diagrammatic simplification of CAM ATA interface Specification, Section 10.1.1, wherein conditions and times under which a particular task file may be updated during write operation are indicated, according to the present invention.

TABLE I

| PHASE | SETUP | ISSUE CMD | 400 ns | XFER DATA | DISC PUTS DATA | READ STATUS | XFER DATA | Disc PUTS DATA | READ STATUS |
|---|---|---|---|---|---|---|---|---|---|
| KEY SIGNALS | BSY=0 | RDY=1 | BSY=1 | BSY=0 DRQ=1 | BSY=1 DRQ=0 | BSY=0 DRQ=1 HIRQ=1 | HIRQ=0 | BSY=1 DRQ=0 | BSY=0 HIRQ=1 |
| TASK FILE OWNER | HOST | HOST | Disc | HOST | Disc | HOST | HOST | Disc | HOST |
| TASK FILE UPDATE | | | | | task file adjusted by # of sectors that have been transferred | | | task file adjusted by # of sectors transferred actually transferred | |

Local microprocessor 14 transforms the logical disc address into physical disc address, according to the contents in the task file registers 24. More specifically, according to the present invention, task file registers 24 include:

Table II is a modified schematic diagram of CAM ATA Specification, Section 10.1.1, wherein conditions and timings under which that task file can be updated during read operations are indicated, according to the present invention.

TABLE II

| PHASE | SETUP | ISSUE CMD | DISC GETS DATA | READ STATUS | XFER DATA | DISC GETS DATA | READ STATUS | XFER DATA | Disc GETS DATA | READ STATUS |
|---|---|---|---|---|---|---|---|---|---|---|
| KEY SIGNALS | BSY=0 | RDY=1 | BSY=1 | BSY=0 DRQ=1 HIRQ=1 | BSY=0 DRQ=1 HIRQ=0 | BSY=1 DRQ=0 HIRQ=0 | BSY=0 DRQ=1 HIRQ=1 | BSY=0 DRQ=1 HIRQ=0 | BSY=1 DRQ=0 | BSY=0 |

TABLE II-continued

| TASK FILE OWNER | HOST | HOST | Disc | HOST | HOST | Disc | HOST | HOST | Disc | HOST |
|---|---|---|---|---|---|---|---|---|---|---|
| TASK FILE UPDATE | | | task file adjusted by # of sectors to be trans- ferred | | | task file adjusted by # of sectors to be trans- ferred | | | task file adjusted by # of sectors to be trans- ferred | |

As indicated by TABLE I and TABLE II, task registers cannot be updated at arbitrary time, but are updated in time-urgent specific phases. The present invention ensures that task registers 24 are updated in a rapid and timely manner.

In TABLE I and TABLE II, BSY (busy), RDY (ready), DRQ (data request), and HIRQ (host interrupt request) preferably correspond to four respective bit positions in the STATUS register. More particularly, the BSY bit indicates that the ATA interface 37 is busy processing a current command or performing a power-on initialization, the RDY bit indicates disc drive 8 is ready, the DRQ bit indicates that data is pending for transfer, and the HIRQ bit indicates that a request to the ATA host system to read the task file registers.

As shown in TABLE I and TABLE II, according to the present invention the ATA host system 41 and disc drive system 43 have different phases to control the task file. It is noted that a phase shift exists with respect to when an update occurs from write to read operations. The present invention compensates for these shifts by appropriate program and instruction set design. Preferably, read condition and write condition program instructions are used to cause task updates to occur at different times for read and for write mode operations.

According to the present invention, this programmable feature provides flexibility permitting adaption at some later date should the relevant protocol evolve. For example, if ATA interface protocol changes occur, ATA sequencer 22 can readily be re-programmed to adopt to the change. In short, software reprogramming is used, as contrasted with IC chip hardware redesign. As noted, ATA sequencer instructions help update all registers within the task file registers.

Conventional hard disc software 39 must properly handle real-time events within a predetermined amount of time if system failure is to be avoided. Some real-time events are asynchronous, e.g., cannot be scheduled on a pre-determined timing basis, and thus require the disc drive software to interrupt its current task. Some such events are time-critical in that their completion will affect system performance.

In prior art ATA disc drivers and ATA interfaces, the subset of events that typically involve conventional disc drive software include:

a) reacting to a write command by setting DRQ signal in the task file and preparing to receive data within 400 ns from receipt of the command (handshaking);

b) interpreting read commands;

c) interpreting write command;

d) doing logical to physical disc geometry conversion;

e) managing the disc cache, i.e. searching therein for requested sectors, allocating storage in the disc cache;

f) certification of disc cache storage space available for the host CPU to write data into;

g) certification of disc cache sectors available for the host to read data from;

h) intersector handshaking, including controlling HIRQ and BSY signals in the task file registers; and i) task registers updating.

Figure 1A:
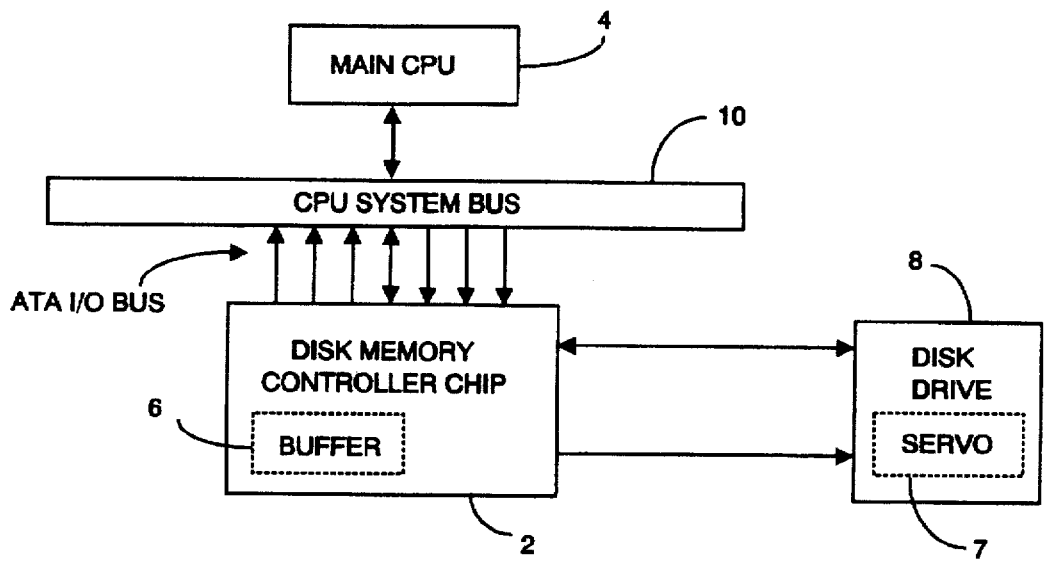
FIG. 1A depicts a prior art controller with an off-chip microprocessor that is directly coupled to the controller buffer memory.
Figure 1B:
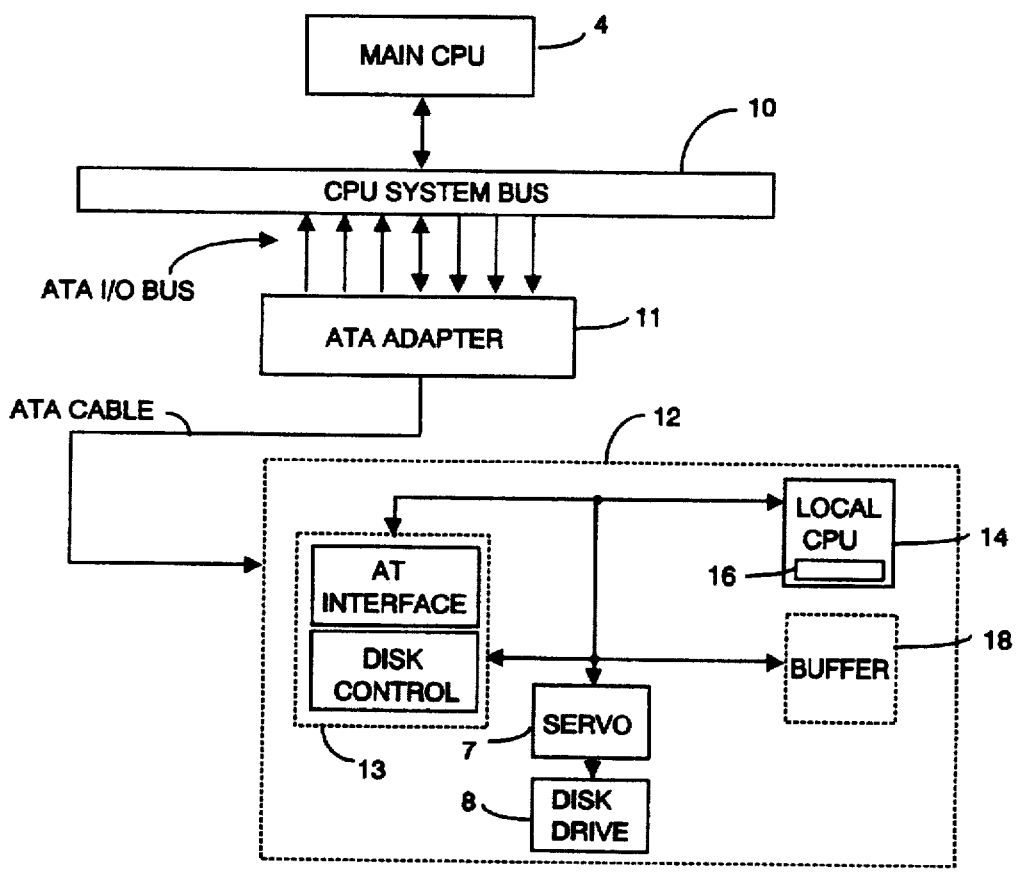
FIG. 1B depicts a prior art controller with an off-chip microprocessor that is decoupled from the buffer memory.

Conventional disc drive software also handles events, including without limitation:

j) spindle motor speed governing rotation of the magnetic storage surface (see element 7 in FIG. 1B);

k) flux sensor positioning radially across the rotating magnetic storage surface (see element 7 in FIG. 1B); and l) initialization and supervision of a conventional disc controller chip (see element 13 in FIG. 1B).

As noted, in the prior art the disc drive software is executed by a relatively complex disc drive processor whose computational power is diminished by having to execute such tasks.

By contrast, according to the present invention, execution of some such events is dedicated to handling by the ATA Sequencer 22, which preferably is fabricated on common IC chip with task registers 24, to which it is directly coupled. These dedicated events include:

1) Real-time events
   i) reacting to a write command by setting DRQ bit; and
   ii) preparing to receive data with 400 ns from command receipt;
2) Time-critical events
   i) intersector handshake; and
   ii) task file update.

According to the present invention, some events are handled jointly by the ATA Sequencer 22 and the local microprocessor 14, including:

3) Non-time-critical events
   i) certification of storage space in the disc cache available for the ATA host system to write data into; and
   ii) certification of sectors in the disc cache available for ATA host system to read data from.

Consequently, according to the present invention, local microprocessor 14 still performs the events (b), (d), (e), (f), (j), (k) and (l) as previously enumerated herein.

Referring to the ATA sequencer controller 20 in FIG. 2, ATA sequencer 22 is preferably a customized on-chip microprocessor. A buffer control 28 communicates with the ATA interface 37 via a first-in first-out ("FIFO") buffer 30, and communicates with a hard disc sequencer 32 via a second first-in first-out ("FIFO") buffer 34. Disc cache 18 also communicates with the buffer control 28. Note in FIG. 2 that, advantageously, there is no direct communications between the disc cache buffer 18 and the ATA interface 37.

The ATA interface controller 20 includes a local microprocessor interface 38 that communicates with the local microprocessor 26, with the ATA sequencer 22, and with the hard disc sequencer 32. The hard disc sequencer 32 is preferably also coupled to an error correcting code ("ECC") logic unit 40 that corrects data read from the hard disc 8.

Disc sequencer 32 transmits data between disc cache 18 (via buffer control 28) and disc drive 8. The data is stored in FIFO buffer 34 before transmission disc drive 8 (via the disc sequencer 32) or to the disc cache 18. Buffer control 28 addresses and provides read or write timing signals for the disc cache 18, and also controls access to disc cache 18.

ATA interface 37 transmits data between disc cache 18 (via buffer control 28) and the ATA host system 41. FIFO buffer 30 stores this data, before its transmission to the ATA host system (via the ATA interface 37) or to the disc cache 18 (via the buffer control 28). Local microprocessor interface 38 provides read and write signals for ATA interface controller 20, decodes register addresses generated by the local microprocessor to select registers. As noted, ECC 40 preferably provides an integrity check on the received data.

In the present invention, the instruction set for the AT sequencer 22 is executed only if a specific flag is set, otherwise the instruction is forced into a NO-OPERATION state. Applicant's operation codes are categorized into three sets:

1) Set one represents instructions that are always to be executed;
2) Set two contains instructions requiring execution only if data was written to the hard disc; and
3) Set three contains instructions executed only if reading from the hard disc.

ATA sequencer 22 preferably provides automatic command receipt for the ATA interface 37, and also provides automatic data transfer with a minimum size instruction set. The sequencer 22 is programmable to perform all operations required to receive and transmit up to 256 sectors to or from the disc cache 18, without substantial intervention from the local microprocessor 26. While the sequencer can read data from the DRAM buffer without assistance, the local microprocessor 14 is necessary to alert the sequencer that data to be read is in the buffer.

As used herein, a write-type command refers to data transferred to the controller chip 20 and/or to the off-chip disc cache 18. Of course, it is understood that not all data transferred to the controller is necessarily written to the disc drive 8. Upon receipt of a write-type command from the ATA interface, ATA sequencer 22 automatically begins a data transfer to an address location within buffer 36 that is pre-specified by local microprocessor 26.

Figure 3:
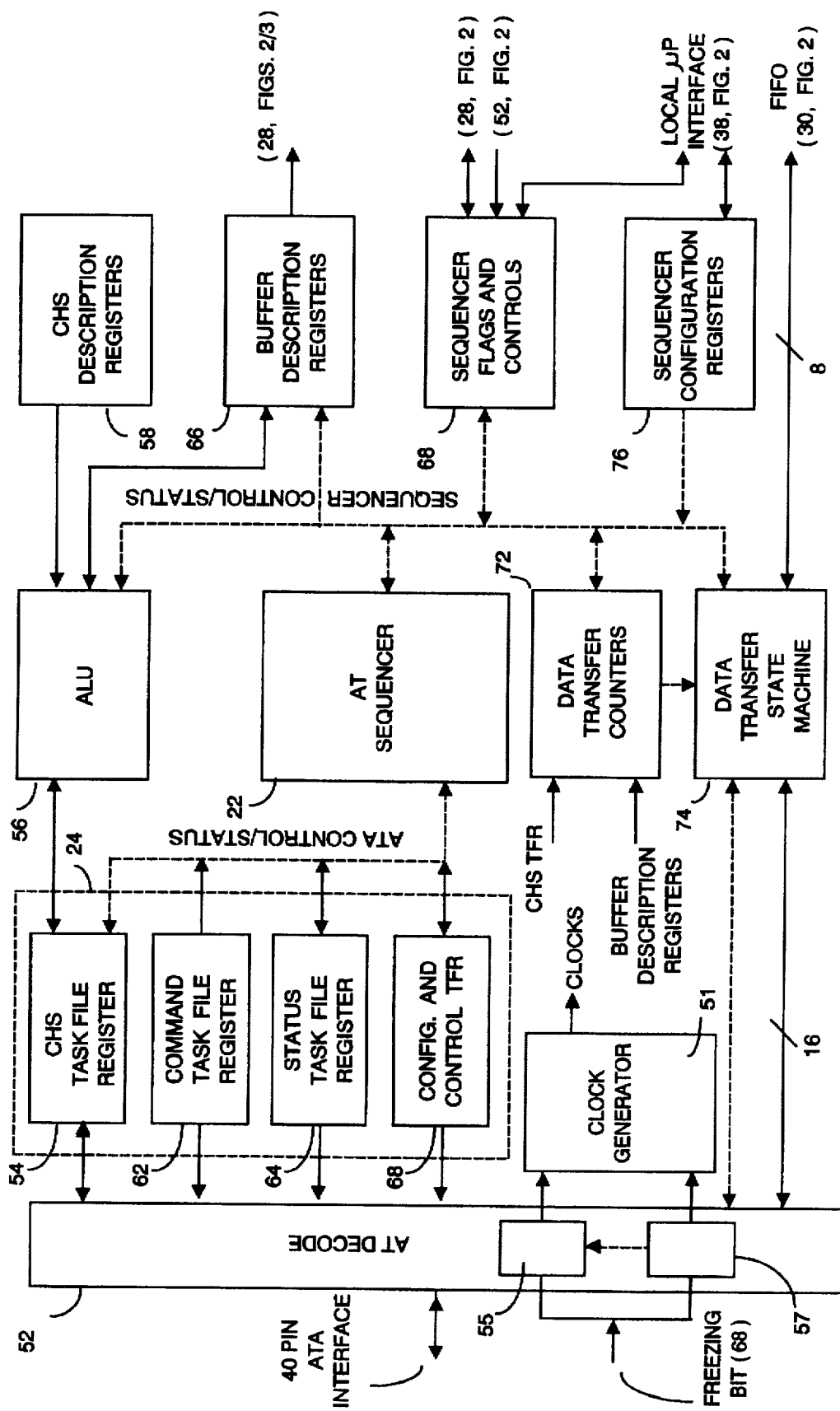
FIG. 3 is a further detailed depiction of an ATA interface including an on-chip ATA interface programmable sequencer, according to the present invention.

FIG. 3 depicts ATA interface 37 in greater detail, wherein solid connecting lines represent data lines, while broken connecting lines represent control lines. In FIG. 3, task file registers (TFR) 24 include CHS (Cylinder-Head-Sector) task file register 54, a command task file register (TFR) 62, a status task file register (TFR) 64, and a configuration and control task file register (TFR) 68. The CHS TFR 54 includes a cylinder high register, a cylinder low register, a drive/head register, and a sector counter register. CHS TFR 54 indicates logic target address on disc drive 8.

Command TFR 62 stores commands from the ATA host system. Status TFR 64 includes bits BSY, RDY, DRQ and HIRQ that provide operational status signals to the ATA host system 41 and to local microprocessor 14. For example, BSY bit=0 and DRQ=1 indicates that the disc drive 8 is ready to accept data.

Configuration and control TFR 68 contains signals that can reset the disc drive 8, or change electrical characteristics of the signals received from ATA interface controller 20.

CHS description registers 58 (or rollover registers) store information allowing ATA sequencer 22 to update CHS TFR 54. Since addresses for head numbers and sector numbers on the hard disc storage surfaces need not be continuous numbers, rollover registers 58 include a head rollover register indicating maximum heads per cylinder, and a sector number rollover register indicating maximum sectors per track.

Rollover registers 58 are initialized by disc drive software 39 according to the logical disc geometry. For example, assume that disc drive software 29 reports to the ATA host system 41 that the logical disc geometry is 0–3 heads, 1–11 h sectors and 0–1 FFh cylinders. In this example, the head rollover register will be initialized to 3, and the sector number rollover register will be initialized to 11. However, there is no need to set a cylinder high or cylinder low rollover register, as cylinder sequence is a continuous number that rolls according to a natural carry.

Under the control of the ATA sequencer 22, ALU 56 increments or decrements the addresses stored in CHS TFR 54, according to the information stored in rollover registers 58. Buffer description registers 66 provide information to ATA sequencer 22 regarding data transfer tasks to and from the disc cache 18. Registers 66 include a set of next registers and a set of current registers, which registers each include a count register and starting address register. The current registers indicate the starting address and the number of sectors in the current data transfer task, and the next registers indicate the starting address and the number of sectors to be transferred in the next data transfer task. When the ATA sequencer 22 is ready to perform the next data transfer task, it executes a LD_CBR instruction to move the contents in the next registers to the current registers.

In one embodiment of the present invention, the read and write operations share current and next registers, while in another embodiment separate and independent current and next registers are provided for read and write operations.

By using the next and current registers, the present invention permits the local microprocessor 14 to queue up two addresses, e.g., two buffer pointers instructing where in the buffer data goes to or comes from. This ability to queue up two buffer pointers advantageously promotes controller throughput.

According to the present invention, disc cache 18 may be operated as a relatively large circular cache. For example, disc drive 8 may be written to (e.g., receive data from the buffer) at the same time that main CPU 4 writes data to the buffer. Local microprocessor 14 provides the ATA sequencer 22 with storage space addresses within the buffer 36 (for example, 4 sectors' worth of storage space), and commands the sequencer to commence data transfer to those addresses. However if the disc drive 8 receives and thus frees additional storage space within disc cache 18, local microprocessor 14 can queue another address therein.

According to the present invention, several registers may be used to set several buffer pointers, instructing whereto or wherefrom in the buffer data belongs. Further, a semaphore handshake is used between the sequencer 22 and the local microprocessor 14 to provide a pointer that is picked up by the ATA sequencer, which clears a flag. The ATA sequencer then operates on that pointer, during which time the local microprocessor can stack up another pointer. When the sequencer completes the first task associated with the first pointer, it will wait unless additional pointers have been queued by the local microprocessor. If such pointers are queued, the sequencer will pick-up any new pointer.

Thus, this approach is used in the present invention to improve throughput at the cost of some additional control logic. Applicant's customized processor uses general purpose registers and a customized control set. Unlike a conventional hardwired state machine, applicant's sequencer provides flexibility.

For example, the control set may be stored in ROM 16 associated with the local microprocessor 26, or the control set may be stored on the disc drive 8 for down-loading as needed. The sequencer may be programmed to perform all necessary ATA intersector-handshaking and updating task registers for read and write type commands.

Sequencer flags and controls 68 provide control signals and flags to ATA sequencer 22, local microprocessor 14, and buffer control 28. Data transfer counters 72 indicate the number of bytes to be transferred, according to the information stored in CHS task file register (CHS TFR) 54 and buffer description registers 66. Data transfer state machine 74 moves data between the ATA host system 41 (via AT decoder 52) and FIFO buffer 30, while data transfer counters 72 tally the number of bytes to be transferred.

Sequencer configuration registers 76 configure data transfer modes for the data transfer state machine 74, including DMA mode, multiple mode, auto-write mode, and 8-bit or 16-bit mode.

Clock generator 51 provides internal clocks for all the circuitry inside the ATA interface controller chip 20. The AT decoder 52 decodes register select from the address and chip select signal on the ATA interface 37, per the CAM ATA interface specification. The AT decoder 52 includes a clock controller 55 that governs the clock generator 51, and a mode detector 57.

The present invention provides a power saving mode that is transparent to the system as a whole in that power may be saved without knowledge or intervention of the AT host. This power saving mode is invoked by causing local microprocessor 16 or AT sequencer 22 to set a freezing bit found in sequencer flags and controls 68. When mode detector 57 detects the setting of this freezing bit, detector 57 sends a mode control signal to the clock controller 55. Upon receipt of the mode control signal, the clock controller turns off the internal clocks going to all logic within the ATA interface controller, except to the mode detector 57 itself.

The power saving mode ceases when local microprocessor 16 or the ATA host writes to any of the task fil registers, an occurrence detected by mode detector 57. Mode detector 57 then so informs the clock controller 55, which in turn restores the internal clocks to all logic inside the ATA interface controller 20. Since operating power is proportional to voltage$^2$.capacitance.frequency, power consumption is substantially zero when the internal clocks are turned off.

In FIG. 3, ATA sequencer 22 controls overall activities of all logic, including BSY, DRQ and HIRQ and updating task file registers 24. By contrast, in the prior art, the local microprocessor would be burdened with controlling these tasks.

Figure 4:
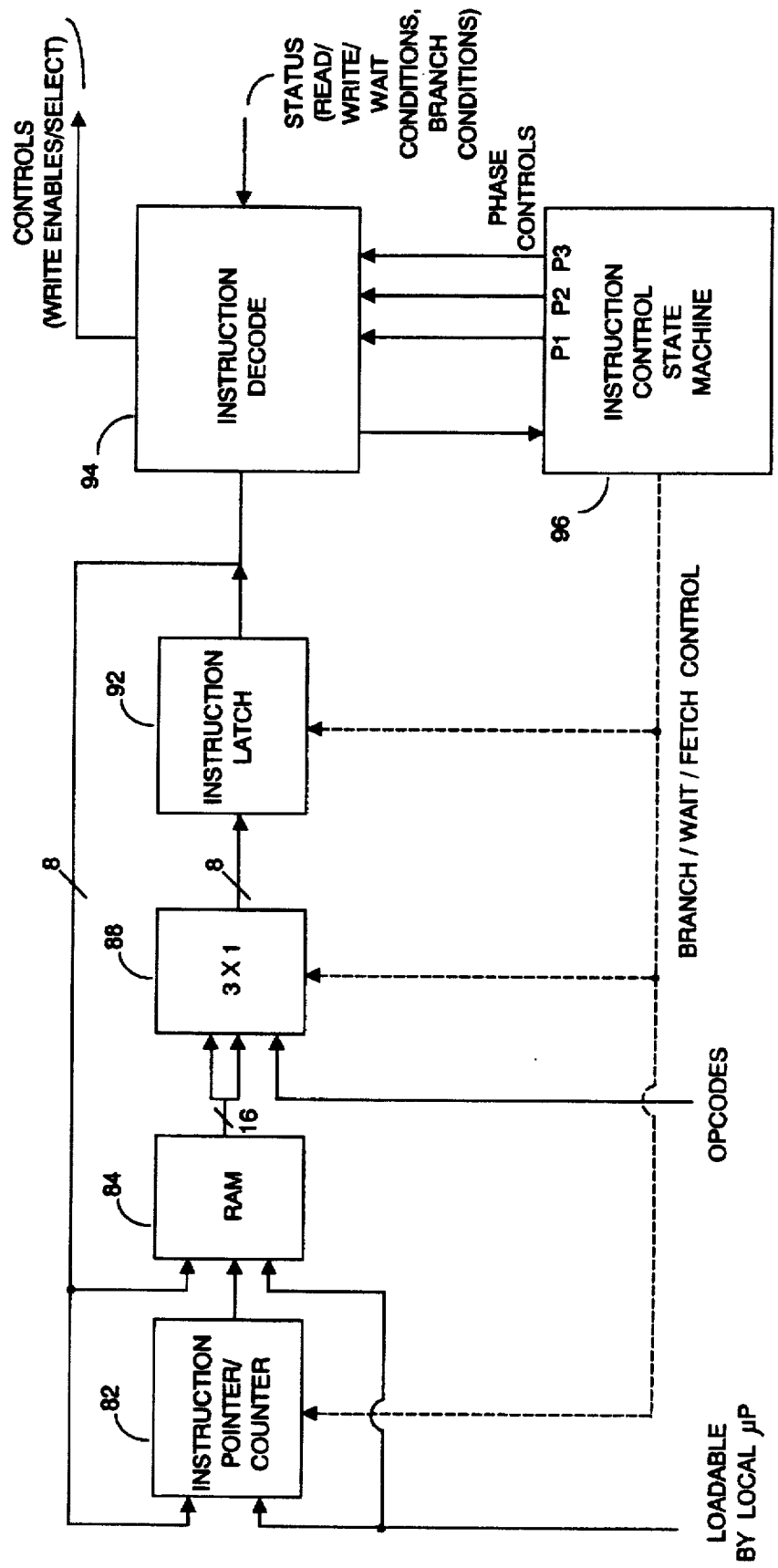
FIG. 4 is a further detailed depiction of an on-chip ATA programmable sequencer including sequencer flags and controls, according to the present invention.

FIG. 4 depicts ATA sequencer 22 in greater detail, wherein solid connecting lines represent data lines, while broken connecting lines represent control lines. The ATA sequencer 22 includes a preferably 16-bit wide×48 byte SRAM control store memory 84 that appears as an 8-bit wide×96 byte programmable memory that is directly addressable from the local microprocessor 14. Control store 64 stores the ATA sequencer program, according to the present invention. It will be appreciated that this implementation economically provides for a control store having 96 instructions, each of which is stored in a single 8-bit wide location.

The size of the ATA sequencer control store is restricted architecturally by the size of the branch address, presently 256 locations. As the control store in the present embodiments has 96 locations, significant growth and flexibility potentials exist.

In FIG. 4, MUX 88 selects instructions from three source: from local microprocessor 14, from instruction latch 92, and from the control store 84. Instruction latch 92 stores the instruction currently being executed, which instruction is decoded by instruction decode 94 whereupon decode 94 generates appropriate instruction control signals. An instruction control state machine 96 provides control phase signal for complex instructions. An instruction pointer/counter 82 indicates the instruction being currently executed.

In the prior art, branch instructions tended to impose excessive hardware and programming overhead. By contrast, when the present invention executes a branch instruction, instruction latch 92 stores both the operation code and subsequently the branch address, which branch address may be used as the control store memory address.

When a branch instruction is fetched into instruction latch 92, two possibilities exist. If the execution does not branch, the instruction decode 94 simply disregards the subsequent byte within control store 84, and increments the instruction pointer 82. But if the execution branches, the subsequent byte in the control store 84 is provided to control store memory 84 as an instruction address, and the branch address is coupled to instruction pointer 82 where the branch address is incremented by one.

The present invention includes the following flags:
a) write flag for indicating write condition;
b) read flag for indicating read condition;
c) first flag for indicating the first sector to be transferred;
d) last flag for indicating the last sector to be transferred;
e) host transfer active flag for indicating that ATA host is active;
f) command active flag for indicating execution of ATA host command;
g) command complete flag for indicating completion of an ATA host command;
h) general purpose flag;
i) direction flag for indicating transfer direction of the disc cache 18;
j) ZF flag indicator flag;
k) multi-sectors flag for indicating that data transfer task includes multiple sectors;
l) TFR flag for indicating receipt of task file registers;
m) freezing signal flag for indicating cut-off of clock signals inside the ATA interface controller chip 20.

In the present invention, the above-listed flags and control signals may be set or cleared by the ATA sequencer instructions, and all flags may be coupled as decoding control signals to the instruction decoder 94.

FIGS. 5A–5F depict the ATA sequencer instructions. Because available space is limited on the IC chip containing controller 20, the ATA sequencer 22 program must be small. As noted, this program may be downloaded from ROM 16 in the local microprocessor 14, or from the hard disc 8 at boot-up. Notwithstanding that it must be implemented in a small area of silicon, the ATA sequencer instruction set must still be sufficiently powerful to handle events required from ATA sequencer 22.

The present invention recognizes that if branch instructions in read and write operations can be avoided, the memory space required to store the instruction set can be reduced. For example, in an 8-bit wide ATA sequencer 22, each branch instruction (if present) would require two 8-bit storage locations. However, by eliminating all such branch instructions in read and write operations, a substantial savings is realized in implementing the remaining instruction set.

As shown by FIGS. 5A–5D, bits 7 and 8 of the ATA sequencer instructions preferably indicate three operation conditions. When these bits are value 00, instructions are defined that are always executed, regardless of the states of the read and write flags. When bits 7 and 8 have value 01, instructions are defined that are executed only under read operation condition (i.e. when the read flag is set). When these bits have value 10, they define instructions that are executed only under write operation condition (i.e. when the write flag is set). If the condition indicated by bits 6 and 7 does not match the current operation condition, the second and third sets of instructions are forced into a NO-OPERATION state. According to the present invention, value 11 for bits 6 and 7 is reserved for definition of Wait instructions.

Schematically, the three operation conditions may be depicted as shown in TABLE III.

TABLE III

| FLAG | INSTRUCTION SET | WHEN EXECUTE |
|------|-----------------|--------------|
| 00   | 1               | always       |
| 10   | 2               | if data flows TO disc |
| 10   | 3               | if data flows FROM disc |

In the present invention, read and write operation instructions can update sector number, drive/head, cylinder high, and cylinder low registers in the task file registers 24. Elimination of branch instructions in read and write operations simplifies programming updating for the task file registers. For example, several instruction sequences can be pre-arranged to execute different tasks for read and write operations. In response to a read or write operation, rather than branch around some of the instruction sequences, the present invention can select desired instruction sequences by setting operation flags.

Bits 4 and 5 of the ATA sequencer instructions determine four sequencer instruction types. As shown in FIG. 6A, when bits 4 and 5 have value 00, SPECIAL types of instructions are defined, including:

| SO(3:0) | Mnemonic | Function |
|---------|----------|----------|
| 0000    | NOP      | no operation |
| 0001    | INITF    | initialize flags |
| 0010    | BBPTR    | back up buffer pointer |
| 1000    | DLY_halt | delay |
| 1001    | DLY_2    | delay of 2 microseconds |
| 1001    | DLY_12   | delay of 12 microseconds |
| 1010    | DLY_50   | delay of 50 microseconds |

As shown in FIG. 5B, value 01 for bits 5 and 4 defines Clear Flag type instructions, including:

| C(3:0) | Mnemonic | Function |
|--------|----------|----------|
| 0000   | CLR DRQ  | clear DRQ bit |
| 0001   | CLR BUSY | clear BSY bit |
| 0010   | CBSD     | clear BSY bit and set DRQ bit |
| 0011   | CLR HIRQ | clear HRIQ bit |
| 0100   | CLR DTM  | clear direction to memory (disc cache 18) |
| 0101   | CLR HTA  | clear host transfer active |
| 0110   | CLR FST  | clear first flag |
| 0111   | CLR LST  | clear last flag, which indicates the last sector to be transferred |
| 1000   | CLR CC   | clear Command Complete flag, which indicates the command has been completed |
| 1001   | CLR GPF  | clear general purpose flag |

As shown in FIG. 5C, a value 10 for bits 5 and 4, Set Flag type instructions are defined, including:

| C(3:0) | Mnemonic | Function |
|--------|----------|----------|
| 0000   | SET DRQ  | set DRQ bit |
| 0001   | SET BUSY | set BSY bit |
| 0010   | SBSD     | set BSY bit and set DRQ bit |
| 0011   | SET HIRQ | set HRIQ bit |
| 0100   | SET DTM  | set direction to memory (disc cache 18) |
| 0101   | SET HTA  | set host transfer active |
| 0110   | SET FST  | set first flag, which indicates the first sector to be transferred |
| 0111   | SET LST  | set last flag, which indicates the first sector to be transferred |
| 1000   | SET CC   | set Command Complete flag |
| 1001   | SET GPF  | set general purpose flag |

As shown in FIG. 5D, when bits 4 and 5 are value 11, COMPLEX instruction types are defined, including:

| C(3:0) | Mnemonic | Function |
|--------|----------|----------|
| 0000   | INC TF_HD | compare current value of the drive/head register with the head roller register |
| 0001   | INC TF_CYL_LO | increment the cylinder low register |
| 0010   | INC TF_CYL_HI | increment the cylinder high register |
| 0011   | INC TF_SN | compare current value of the sector number register with the sector number rollover register |
| 0100   | DEC LC1  | decrement ATA sequencer loop counter 1 |
| 0101   | DEC LC2  | decrement ATA sequencer loop counter 2 |
| 0110   | DEC TF_SC | decrement ATA sector count register |
| 0111   | DEC CBXC | decrement the current buffer transfer count (the count register in current registers) |
| 1000   | TST0 CBXC | test the current buffer transfer count (the count register in current registers) to determine if equal to 0 |
| 1001   | TST0 TF_SC | test the sector count register (in task file register) to determine if equal to 0 |
| 1010   | TST0 TF_SC | test sector count register to determine if equal to 1 |
| 1100   | LD_CBR   | load the current buffer registers |
| 1101   | LD_BC    | load sections of the byte counter |

As shown in FIG. 6E, when ATA sequencer instruction bits 7-7-5-4 are value 1100, WAIT instructions are defined providing a handshaking mechanism between the ATA sequencer, local microprocessor, ATA host system, and EUROPA buffer control section, including:

| C(3:0) | Mnemonic | Function |
| --- | --- | --- |
| 0000 | WAIT CA | wait for ATA command active |
| 0001 | WAIT SEL | wait for ATA host to select chip |
| 0010 | WAIT HIRQ0 | wait for host |
| 0011 | WAIT HFR | wait for host FIFO ready |
| 0100 | WAIT BCC | wait for the byte counter complete |
| 0101 | WAIT TFR | wait for the task file to be received |
| 0110 | WAIT CC | wait for the command completion |
| 0111 | WAIT NRC | wait for next registers to be certified |

FIG. 6F depicts BRANCH instructions of 2-byte length. The first byte specifies the instruction and condition, and the lower 7 bits of the second byte specify the branch address if the condition evaluates as true. If the branch condition is true, the instruction pointer 82 will be loaded with the branch address, and execution will continue at that address. If the condition for the branch is not true, instruction control state machine 96 in FIG. 4 will inhibit the execution of the instruction during the next clock cycle. The branch instructions includes:

| BC(4:0) | Mnemonic | Function |
| --- | --- | --- |
| 00000 | BNR | branch if read flag = 0 |
| 00001 | BR | branch if read flag = 1 |
| 00010 | BNW | branch if write flag = 0 |
| 00011 | BW | branch if write flag = 1 |
| 00100 | BNWR | branch if read and write flags = 00 |
| 00101 | BNZ | branch if ZF = 0 |
| 00110 | BZ | branch if ZF = 1 |
| 00111 | BGT | branch if GFT = 1 |
| 01000 | BF | branch if FIRST = 1 |
| 01001 | BL | branch if LAST = 1 |
| 01010 | BRE | branch if TF_ERROR = 1 |
| 01011 | BDMA | branch if DMA = 1 |
| 01100 | BGPF | branch if GPF = 1 |
| 01101 | BCC | branch if CC = 1 |
| 01110 | BFW | branch if FIRST and LAST = 11 |
| 01111 | BC2 | branch if CL2 = 1 |
| 10000 | BRU | branch unconditionally |
| 10001 | BNC | branch if CARRY = 0 |

According to the present invention, SPECIAL, CLEAR FLAG, SET FLAG, and COMPLEX instructions are subject to the control of the condition bits 6 and 7 in the sequencer instructions. For a read condition (bits 7 and 6=01), an instruction executes only if the read flag is set, otherwise it is a NO OPERATION (NOP). For a write condition (bits 7 and 6=10), an instruction executes only if the write flag is set, otherwise it is a NO OPERATION.

The ATA sequencer instructions are preferably one clock cycle long, except for COMPLEX instructions, which are three clock cycles long due to the relatively complicated and time-consuming events they govern. Three clock cycles are necessary since there are multiple states to single instructions. For example, during an increment instruction:

phase 1) value to be incremented is presented to plus-one logic;

phase 2) value +1 is latched in a holding register;

phase 3) value +1 is written over original value (Advantageously, the holding register adds a level of pipelining and permits use of transparent latches for storing CHS inc/dec registers (cylinder, head and sector task file registers) for a significant savings in logic gates in implementation.)

When a COMPLEX instruction is decoded, instruction decode 94 provides a control signal to the instruction control state machine 96 via 102. The instruction control state machine 96 delays the instruction pointer 82, and holds this instruction for three clock cycles.

Having described the preferred configuration, operation of the present invention will now be described, beginning with steps typically associated with initialization and preparation of the ATA interface controller to receive commands from the ATA host system.

With reference to write operations:

1) Before the ATA interface controller 20 receives commands from the ATA host system 41, an ATA program is loaded into control store memory, for example using disc drive software 39;

2) The ATA interface controller 20 is initialized using ATA system software 35, as follows:
   i. The next registers located inside buffer description register 66 in FIG. 3 are initialized, their contents indicating starting address and the number of sectors to be transferred in the forthcoming data transfer task;
   ii. The head rollover and sector number rollover registers are initialized, which registers are located within the CHS description (rollover) registers, element 58 in FIG. 3. The contents in the rollover registers reflect the logical disc geometry. For example, if the disc drive software 39 has reported to the ATA host system 41 that its logical disc geometry is 0–3 heads, 1–11 h sectors, and 0–1 FFh cylinders, then the head rollover register will be initialized with 3, and the sector number rollover register will be initialized with 11 h.

3) The ATA host system software 35 initializes instruction pointer 82 in FIG. 4 to point to the sequence shown below to complete initialization. As noted, CAM ATA Specification allows the ATA interface only 400 ns from issuance of a write command to prepare disc drive 8 to accept data. Thus, before receipt of a command, the disc drive software 39 must know a priori where in the disc cache 18 the "write-data" should be written (as time does not permit this decision after receipt of the command). Thus, ATA host system software releases ATA sequencer 22, permitting ATA sequencer 22 to execute the following sequence of instructions:
   i. WAIT NRC pauses until the disc drive soft-ware 39 initializes the next registers;
   ii. LOAD CBR loads the current registers with next registers, and activates the channels to the disc cache 18 for a write to the specified address. For example, if the starting address register in the next registers is 0, and the count register in the next register is 2, space for 2 sectors of data at location 0 in the disc cache 18 is indicated. When the ATA sequencer 22 executes this instruction, an interrupt is generated to the disc drive software 39 indicating that the contents of the next registers are removed and available for reloading;

3) ATA sequencer 22 executes CLR BUSY to clear the BSY bit in the status register to inform the ATA Host system that the ATA interface controller 20 is ready to accept commands;

4) ATA sequencer 22 executes WAIT CA to wait for an ATA host system command;

Typically, a write operation involves the following steps:

1) The ATA host system software 35 reads the status register in the task file registers 24 to determine whether disc drive 8 is available for command (a write command in this example). Typically a value of 50H is read, indicating that the disc drive is ready and not busy;

2) ATA host system software 35 writes the task file registers 24 with target address for the sector(s) to be read. This involves writing the drive/head register, sector number register, cylinder high register, cylinder low register and sector counter register. For example sector number register=11 h, sector counter register=3 h, drive/head register=A3 h, cylinder high register=00 and cylinder register=FF.

3) The ATA host system software 35 writes the command register with a write command=31 h.

4) The ATA interface controller 20 detects that a write command has been received in the command register while executing WAIT CA. In response, the CMD_RCVD interrupt flag, the write flag, and the CMD-ACTIVE flags are set, interrupting disc drive software 39. These flags denote that a write command is under execution. The ATA sequencer 22 SET BUSY instruction sets the BSY bit;

5) Since the CMD_ACTIVE flag is set, the ATA sequencer 22 will complete the WAIT CA instruction, and then execute the following instruction sequence:
i. LOAD BC to load the data transfer counters 72 with the number of bytes to be transferred, as decoded from task file registers 24 and associated flags. In the present example the counter will be loaded with 512 bytes=1 sector of data, since the write command is a single sector type of write command. The LST flag may also be set by LOAD BC if the ATA sequencer 22 determines that this is the last sector to be transferred;
ii. CBSD clears the BSY bit and sets the DRQ bit to indicate to the ATA host system that the disc drive 8 is ready to accept data;
iii. WAIT BCC causes the ATA sequencer 22 to await completion of data transfer. During this phase, the ATA host system hardware transmits the data to the ATA interface controller hardware and the disc drive 8 in a predetermined format. The data consists of a number of words, where 1 word is 2 bytes or 16 bits of data, and the data transfer counters 74 will be decremented accordingly. The data received by the ATA interface are transferred to the 32-byte FIFO buffer 30, which in turn is emptied into the disc cache 18 in 16-byte blocks whenever the disc cache 18 is available;

6) When all specified data has been transferred to the FIFO buffer 30, the data transfer counters 72 will equal 0, whereupon the ATA sequencer 22 will complete the WAIT BCC instruction. The last step of this instruction is to clear the DRQ bit. If the write flag is set, the BSY bit will always be set when this WAIT instruction completes. In the present example, the BSY bit will be set and the DRQ bit cleared, which indicates to the ATA host system 41 that disc drive 8 has received and is busy processing the data;

7) ATA sequencer 22 then executes the following instruction sequence to update the task file registers 24 and prepare to receive the next sector:

i. DEC SC decrements the sector count register, e.g., from 3→2 in the present example;
ii. INC SN increments the sector number register, e.g., from 11→1 in the present example;
iii. BR NZ, end to branch to end unless rollover is indicated;
iv. INC HEAD to increment the head/drive register, 3→0 in the present example;
v. BR NZ, end to branch to end if rollover registers are not indicated;
vi. INC CYL_LO to increment cylinder low register, e.g., from FFh→0 in the present example;
vii. BR NC, end to branch to end if there is no carry
viii INC CYL_HI to increment cylinder high register 00→1 in the present example;

During the write operation, the task file registers 24 are updated to reflect the address of the sector currently being transferred. The ATA sequencer 24 can perform this update much more quickly than can local microprocessor 14 since sequencer 24 has a faster execution speed and a customized instruction set. Further, ATA sequencer 22 executes its customized instructions to handle dedicated events without invoking an interrupt procedure. These advantages are available when processing other time-critical events, for example, setting/clearing BSY and DRQ bits, and generating IRQs to the ATA host system 41;

8) In the present example, disc drive software 39 indicated available space for 2 sectors at location 0 in the disc cache 18. Thus, sequencer 22 can handle another sector transfer without further assistance from the disc drive software 39. The ATA sequencer 22 determines that there is space for another sector by executing the following sequence:
i. DEC CBXC decrements the counter register in the current registers 2→1 in the present example;
ii. BR ZERO to get a new pointer;
From the time ATA sequencer 22 accesses the next registers and moves their contents to the current registers, the next registers become available to disc drive software 39. Disc drive software 39 then "posts" that space is available within disc cache 18, and "posts" transfer tasks via the next registers to the ATA sequencer. This mechanism frees the disc drive software 39 from time-critical responsibilities associated with the ATA interface 37;

9) After completing task file registers 24 update, ATA sequencer 22 repeats the LOAD BCC, CBSD, WAIT BCC sequence for the second sector, and generates an interrupt to the ATA host system indicating acceptance of the previous sector and readiness of disc drive 8 for the second sector;

10) Steps 5), 6), 7) and 8) are thus repeated. At step 7) only the sector number register will be modified from 1→2, and at step 8) ATA sequencer 22 decrement the counter register in the current registers from 1→0 by executing DEC CBXC instruction. In this manner, sequencer 22 discovers it must "pick-up" another "data transfer task" from the disc drive software 39. However, sequencer 22 must learn whether more space is available in disc cache 18 for the remaining sector in the transfer. Therefore, the WAIT NRC, LOAD CBR sequence is executed before the final sector can be transferred. If the disc drive software 39 has been able to "post" another sector of space, these instructions can execute within a few hundred ns. Otherwise the ATA sequencer 22 will wait in the WAIT NRC instruction until the disc drive software 39 certifies availability of the next registers;

11) The LOAD BC instruction sets the LST (last sector) flag upon detection that the last sector transfer is in progress, which status is decoded from the sector count register, MULT_FLAG, MULT_COUNT. After setting the LST flag, ATA sequencer 22 "picks-up" a final set of the next registers to prepare and await a "future" write command. The BSY bit is set and disc drive software 39 sets the CMD_CMPLT flag, indicating successful transferred of the sectors from disc cache 18 to disc drive 8;

12) When CMD_CMPLT has been set, ATA sequencer 22 clears the BSY bit to generate a final interrupt to the ATA host system, then return to WAIT CA, while it awaits a command to be active.

Typically, a read operation involves the following steps:

1) The ATA sequencer 22 executes WAIT CA instruction to await an activation command, and the host system software 35 reads the status register to determine whether the disc drive 8 is available for commands. Typically a value of 50H is read indicating that the disc drive is ready and not busy;

2) Host system software 35 writes the task file registers 24 with target addresses for the sector(s) to be read;

This procedure involves writing the drive/head, sector number, cylinder low, cylinder high and sector count registers with the target address. For example sector number register=11 h, sector counter register=33 h, drive/head=A3 h, cylinder low register=FF, cylinder high register=00;

3) Host system software 35 writes the command register with a READ MULTIPLE command=C5 h for read multiple sectors. In the present example, the ATA host system software 35 has previously sent a command to specify 10 h sectors in a multiple "block." The disc drive software 39 concurs with this specification and has initialized the multiple count register to 10 h within ATA interface controller 20.

4) The ATA Interface Controller detects that a command has been received, and the CMD_RCVD interrupt to the disc drive software 39 is set as is the CMD_ACTIVE flag. This causes the ATA sequencer to leave the WAIT CA instruction. ATA sequencer 22 sets the BSY flag by executing 47 the SET BUSY instruction;

In the present invention, the ATA sequencer 22 does not decode read-type commands, and thus has no knowledge whether data to be read is within the disc cache 18. Consequently, the ATA sequencer 22 waits for the disc drive software 39 to indicate that the data is available, a procedure that may require disc drive software 39 to transfer requested data from the hard disc 8;

5) The ATA sequencer 22 completes the WAIT CA instruction as the CMD_ACTIVE flag is set, and then executes WAIT TFR to wait for the disc drive software 39 to interpret the command. The disc drive software 39 sets the TFR flag after retrieving the task file registers;

6) The ATA sequencer 22 completes the WAIT CA instruction since the TFR flag is set, and then executes WAIT NRC to wait for the disc drive software to initialize the next registers;

The disc drive software 39 determines whether the requested sectors are present within the disc cache 18, their presence being assumed in the present example. Thus, disc drive software 39 initializes the next read register in the following manner:

The starting address register is 555 h, and the count register is 33 h, which values indicate all 33 h sectors of data are already at location 555 h within the disc cache 18 (a so-called "cache hit"). By posting the entire transfer task to the ATA sequencer 22, the disc drive software 39 is free to resume other activities, e.g., it can transfer sectors that it expects to be requested in the future from the hard disc 8 to the disc cache 18;

7) When the disc drive software 39 writes to the count register in the next registers the NRC flag is set, and ATA sequencer 22 completes the WAIT NRC instruction and proceeds with the following instruction sequence:

i. CLR DTM to clear DTM (direction to memory, to disc cache 18 here) and to change the direction for DFM (direction from memory, here disc cache 18);

ii. LOAD CBR to load current registers with next registers, and activate channels to disc cache 18 for a read at address 555 h;

When the ATA sequencer 22 executes LOAD CBR, an interrupt is generated to the disc drive software 39 indicating that the next registers are available for reloading;

iii. WAIT HFRD flag indicates a wait until the buffer control 28 moves data from the disc cache 18 into the 32-byte FIFO buffer 30. WAIT HFRD lasts until the buffer control 28 has completed this task;

8) To update the task file registers 24 and prepare to present the first "block" of multiple sectors, the ATA sequencer 22 executes the following sequence:

i. LOAD BC loads the data transfer counters 72 with the number of bytes in this "block" of multiple sectors, and loads loop counters (LC1 and LC2) with the number of sectors in this "block" of multiple sectors. In the present example, the data transfer counters 72 are loaded with 16×512 bytes (MULT COUNT×sector size in bytes). The LST flag may be set by this instruction if the ATA sequencer 22 decodes that this will be the last transfer;

ii. DEC SC decrements the sector count register, 3→2 in the present example;

iii. INC SN increments the sector number register, here 11→1;

iv. BR NZ, end to branch to end if rollover not otherwise indicated;

v. INC HEAD increments drive/head register, here 3→0;

vi. BR NZ, end branch to end if rollover not indicated;

vii. INC CYL_LO increments the cylinder low register, FFh→0 in the present example;

viii NC, end to branch to end if there is no carry;

ix. INC CYL_HI increments the cylinder high register, here 00→1;

xi. DEC LC1 decrements the loop counter by 1;

xii. BR NZ, start to repeat steps ii–xi until the loop counter=0;

The task file registers 24 are updated to reflect the address of the sector(s) currently available for transfer. For a multiple "block" this is the address of the last sector in the currently available "block". The sector count register is decremented to indicate the number of sectors remaining to be transferred;

9) The ATA sequencer 22 now executes the following sequence, culminating in a WAIT BCC wait for data transfer counters 72 to complete:
   i. SET HIRQ to generate an interrupt indicating that sectors are ready for transfer; and
   ii. CBSD to clear busy and set the DRQ bit;
10) WAIT BCC
   During this phase, the ATA host system hardware requests the data from the ATA interface controller 20 and the disc drive 8 in a predetermined format. The data consists of a number of words (1 word=2 bytes=16 bits), and the data transfer counters 74 will be decremented accordingly. The data is transferred by the ATA Interface Controller hardware from a 32 byte FIFO buffer 30, which in turn is refilled from the disc cache in 16-byte blocks by the buffer control 28 whenever the disc cache 18 is available.
   When all of the specified data has been transferred, the data transfer counters 72=0, and the ATA sequencer 22 will complete the WAIT BCC instruction. The last step of this instruction is to clear DRQ, and if the LST flag is not set, a BSY bit will be set when this WAIT instruction completes. In the present example, the BSY bit will be set and the DRQ bit cleared, thus indicating to the ATA host system 41 that the disc drive 8 is busy obtaining the remaining data.
11) At this juncture, the ATA sequencer 22 executes the following sequence and determines whether it can proceed to transfer the next block of sectors:
   i. DEC CBXC to set a value that in the present example is reduced from 33 h→23 h at step v;
   ii. DEC LC2 to set a value, that in the present example is reduced from 10 h→0;
   iii. BR NZ to start;
   iv. TST0 CBXC to test the CBXC to see whether it is zero;
   v. BR ZR to get next instruction pointer if other sectors are not available, and to wait for the disc drive software to "post";
12) Steps 7), 8), 9) 10) and 11) are repeated with the result that:
   CBXC (data transfer counters 72=3h
   sector count register=3 h
   sector number register=05 h;
   Cylinder low register=00;
   Cylinder high register=07;
   Drive/head register=A2.
14) Upon returning to step 7), LOAD BC is expected to load the data transfer counters 72 with the remaining number of bytes=512×3 (sector size×sector count register), and to load the loop counters (LC1 and LC2) with the number of sectors in this "block" of multiple sectors (sector counter=3). The LST flag will be set since SECTOR COUNT≦MULT_COUNT, and the MULT flag is set. A final update of the task file registers results, which in the present example is:
   sector count register=0 h
   sector number register=11 h;
   Cylinder low register=00;
   Cylinder high register=01;
   Drive/head register=A2.
   The ATA sequencer proceeds with steps 8), 9) and 10) to complete the transfer. BSY will not be set in step 10) since there will be no more sectors to transfer, and the ATA sequencer 22 will return to WAIT CA.
The first flag may be used by the ATA sequencer such that an update of the task file does not occur before the transfer of the first block. After the first block has transferred, the ATA sequencer can clear this flag. All further block transfers may include a task file update, as specified in step 8). Thus, by loading the ATA sequencer with various programs, the ATA protocol may be modified for compatibility with various ATA hosts. It will be appreciated that the present invention allows compatibility even with AT hosts that may deviate from the CAM ATA specification.

In addition to providing flexibility, the present invention is rapid in operation. In practice, an ATA sequencer 22 according to the present invention can perform dedicated events approximately twenty-times faster than can a local microprocessor. By executing a set of customized instructions designed to handle dedicated events without branching, execution speed is enhanced with resultant improved disc drive 8 system throughput. By allowing the ATA sequencer 22 to handle dedicated events directly, no interrupt process is required, as in the prior art where a local microprocessor handles real-time events using an interrupt process. Further, applicant's ATA sequencer 22 and target registers 24 are preferably fabricated on a common IC chip, which promotes faster execution times due to minimized signal paths. In addition, the average number of clock cycles needed to execute an instruction is less than that associated with a local microprocessor. It will be further appreciated that the present invention increases the computational power of local microprocessor 16, while simultaneously reducing complexity required of local microprocessor 26.

Modifications and variations may be made to the disclosed embodiments without departing from the subject and spirit of the invention as defined by the following claims.

What is claimed is:

1. An ATA-compatible hard disc controller comprising a local microprocessor, and an ATA programmable sequencer comprising:

a sequencer microprocessor for interfacing, over a host bus, between an ATA host system including a host processor and a hard disc drive system including said controller and said local microprocessor;

at least one task file register, coupled to said sequencer microprocessor, for holding information including addresses corresponding to locations on said hard disc drive whereat information is stored or retrieved;

a program instruction set for controlling operation of said sequencer microprocessor;

said program instruction set causing said sequencer microprocessor to execute in a first direction for read operations, to execute in a second direction for write operations, or to otherwise execute always, wherein branching and interruption of said host processor is avoided; and wherein said program instruction set programs said sequencer microprocessor by dedicating a plurality of real-time events occurring on said host bus to be handled by said sequencer microprocessor said plurality of real-time events dedicated to said sequencer microprocessor including reacting to a write command, preparing to receive data, intersector handshake, and task file update;

such that said sequencer microprocessor executes said sequencer instructions to handle said plurality of real-time events so as to allow said sequencer to perform all operations required to transmit and receiver multiple sectors of data to or from said host system promptly and without substantial intervention from said local microprocessor; and said program instruction set further programs said sequencer microprocessor to manage said task file register means associated with said host bus so as to decouple said local microprocessor from real-time management of said addresses in said task file register.

2. The sequencer microprocessor of claim 1, wherein said sequencer conforms to the CAM ATA Interface Specification.

3. The sequencer microprocessor of claim 1, wherein said program instruction set programs said sequencer microprocessor by providing a plurality of sequencer instructions for execution by said sequencer microprocessor, causing said sequencer microprocessor to set and clear a plurality of control signals and flags, and to update said task file register, said sequencer microprocessor controlling overall logical control activities for reading and writing to said hard disc system, decoupling said local microprocessor from said control activities.

4. The sequencer microprocessor as in claim 3 further comprising a plurality of registers including at least a flag and control register and a rollover register, said flag and control register providing said sequencer microprocessor with said control signals and flags, said rollover register storing information allowing said sequencer microprocessor to update said task file register, such that said sequencer microprocessor executes said sequencer instructions through said plurality of registers to handle said plurality of real-time events and management of said task file register.

5. The sequencer as in claim 1 wherein said sequencer enables said hard disc controller to accommodate changes in applicable ATA interface without requiring substantial hardware modifications to said sequencer itself.

6. The sequencer as in claim 3 wherein said task file register includes a set of task file registers providing hardware implementation of the CAM ATA Interface Specification ATA task file, said task file register directly coupled to said sequencer where said sequencer controls a correct status of said set of task file registers, and said sequencer ensuring that said set of task file registers are updated promptly and quickly.

7. The sequencer of claim 1 wherein said program instruction set further includes instructions:

causing said sequencer microprocessor to handle said intersector handshake without intervention from said local microprocessor;

enabling automatic receipt for said write data event to said host processor; and modifying ATA protocols to accommodate different ATA host systems;

where said instructions set is small to minimize integrated circuit chip area required to implement said instructions.

8. The sequencer as in claim 4 wherein said flags and controls register includes a freezing bit for placing said sequencer into a power saving mode, said sequencer microprocessor invoking said power saving mode by setting said freezing bit in said flags and controls register such that power is saved without knowledge or intervention from said host system.

9. An ATA-compatible hard disc controller comprising a local microprocessor, and an ATA programmable sequencer comprising:

a sequencer microprocessor for interfacing, over a host bus, between an ATA host system including a host processor and a hard disc drive system including said controller and said local microprocessor;

at least one task file register, coupled to said sequencer microprocessor, for holding information including addresses corresponding to locations on said hard disc drive whereat information is stored or retrieved;

a program instruction set for controlling operation of said sequencer microprocessor;

said program instruction set causing said sequencer microprocessor to execute in a first direction for read operations, to execute in a second direction for write operations, or to otherwise execute always, wherein branching and interruption of said host processor is avoided;

wherein said program instruction set programs said sequencer microprocessor by dedicating a plurality of real-time events occurring on said host bus to be handled exclusively by said sequencer microprocessor means such that said local microprocessor is decoupled from said plurality of real-times events;

said plurality of real-time events dedicated to said sequencer microprocessor means including one or more of:

a) reacting to a write command by setting a DRQ control signal;

b) preparing to receive data;

c) intersector handshake; and d) task file update; and said program instruction set further programs said sequencer microprocessor to manage said task file register means associated with said host bus so as to decouple said local microprocessor from real-time management of said addresses in said task file register.

10. A sequencer as claimed in claim 9 wherein said intersector handshake includes controlling HIRQ and BSX signals in said task file register.

11. A sequencer as claimed in claim 9, wherein said program instruction set enables said sequencer to handle non-time-critical events jointly with said local microprocessor, said non-time-critical events including certification of storage space in a disc cache available for said host system to write data into or read data from.

12. A sequencer as claimed in claim 11 wherein said sequencer microprocessor is adapted to transmit a plurality of data sectors to or from said disc cache, utilizing an address supplied by said local microprocessor.

13. A sequencer as claimed in claim 12 including task file registers for storing buffer pointers instructing said sequencer whereto or wherefrom data is stored in said cache, said local microprocessor queuing up pointers in said task file registers.

14. A sequencer as claimed in claim 1 wherein said program instruction set is stored on said disc drive and downloaded as needed by said sequencer microprocessor.

15. A sequencer as claimed in claim 1 wherein said task file register includes a flag and control register, and wherein said flags and controls register includes a freezing bit for placing said sequencer into a power saving mode, said sequencer microprocessor invoking said power saving mode by setting said freezing bit in said flags and controls register such that power is saved without knowledge or intervention from said host system.

16. An ATA-compatible hard disc controller comprising a local microprocessor, and an ATA programmable sequencer comprising:

a sequencer microprocessor for interfacing, over a host bus, between an ATA host system including a host processor and a hard disc drive system including said controller and said local microprocessor, one or more task file registers directly coupled to said sequencer microprocessor on a common substrate for holding information including addresses corresponding to locations on said hard disc drive where information is stored or retrieved;

a program instruction set for controlling operation of said sequencer microprocessor;

said program instruction set causing said sequencer microprocessor to control status in said task file registers to update said task registers in time urgent specific phases; and wherein said program instruction set programs said sequencer microprocessor by dedicating a plurality of real-time events occurring on said host bus to be handled by said sequencer microprocessor means such that said local microprocessor is decoupled from said plurality of real-times events causing said sequencer microprocessor to handle said intersector handshake without intervention from said local microprocessor, enabling automatic receipt for said write data event to said host processor, and modifying ATA protocols to accommodate different ATA host systems; and said program instruction set further programs said sequencer microprocessor to manage said task file register means associated with said host bus so as to decouple said local microprocessor from real-time management of said addresses in said task file register.

17. The sequencer microprocessor as in claim 16 wherein said program instruction set programs said sequencer microprocessor by providing a plurality of sequencer instructions for execution by said sequencer microprocessor, causing said sequencer microprocessor to set and clear a plurality of control signals and flags, and to update said task file register, said sequencer microprocessor controlling overall logical control activities for reading and writing to said hard disc system, decoupling said local microprocessor from said control activities.

18. The sequencer of claim 16 wherein said program instruction set further includes instructions:

causing said sequencer microprocessor to handle an intersector handshake without intervention from said local microprocessor;

enabling automatic receipt for write data to said host processor; and modifying ATA protocols to accommodate different ATA host systems;

where said instructions set is small to minimize integrated circuit chip area required to implement said instructions.

19. The sequencer as in claim 16 wherein said flags and controls register includes a freezing bit for placing said sequencer into a power saving mode, said sequencer microprocessor invoking said power saving mode by setting said freezing bit in said flags and controls register such that power is saved without knowledge or intervention from said host system.

20. The sequencer as in claim 16 wherein said plurality of real-time events dedicated to said sequencer microprocessor includes one or more of:

reacting to a write command by setting a DRQ control signal;

preparing to receive data within a set time from command receipt;

intersector handshake; and task file update;

such that said sequencer microprocessor executes said sequencer instructions to handle said plurality of real-time events so as to allow said sequencer to perform all operations required to transmit and receive multiple sectors of data to or from said host system promptly and without substantial intervention from said local microprocessor.

21. The sequencer microprocessor as in claim 16 wherein said program instruction set programs said sequencer microprocessor by providing a plurality of sequencer instructions for execution by said sequencer microprocessor, causing said sequencer microprocessor to set and clear a plurality of control signals and flags, and to update said task file register, said sequencer microprocessor controlling overall logical control activities for reading and writing to said hard disc system, decoupling said local microprocessor from said control activities.

22. The sequencer microprocessor as in claim 21 further comprising a plurality of registers including at least a flag and control register and a rollover register, said flag and control register providing said sequencer microprocessor with said control signals and flags, said rollover register storing information allowing said sequencer microprocessor to update said task file register, such that said sequencer microprocessor executes said sequencer instructions through said plurality of registers to handle said plurality of real-time events and management of said task file register.

23. A sequencer as claimed in claim 16, wherein said program instruction set enables said sequencer to handle non-time-critical events jointly with said local microprocessor, said non-time-critical events including certification of storage space in a disc cache available for said host system to write data into or read data from.

24. A sequencer as claimed in claim 23 wherein said sequencer microprocessor is adapted to transmit a plurality of data sectors to or from said disc cache, utilizing an address supplied by said local microprocessor.

25. A sequencer as claimed in claim 24 including task file registers for storing buffer pointers instructing said sequencer whereto or wherefrom data is stored in said cache, said local microprocessor queuing up pointers in said task file registers.

26. An ATA-compatible hard disc controller comprising a local microprocessor, and an ATA programmable sequencer comprising:

a sequencer microprocessor for interfacing, over a host bus, between an ATA host system including a host processor and a hard disc drive system including said controller and said local microprocessor;

one or more task file registers directly coupled to said sequencer microprocessor on a common substrate for holding information including addresses corresponding to locations on said hard disc drive where information is stored or retrieved;

a disc cache for storing data from said hard disc drive prior to transmission to said ATA host system;

a program instruction set for controlling operation of said sequencer microprocessor;

said program instruction set causing said sequencer microprocessor to control status in said task file register to update said task registers in time urgent specific phases, said sequencer transmitting a plurality of sectors to said ATA host utilizing an address supplied by said local microprocessor; and wherein said program instruction set programs said sequencer microprocessor by dedicating a plurality of real-time events occurring on said host bus to be handled by said sequencer microprocessor means such that said local microprocessor is decoupled from said plurality of real-times events, said plurality of real-time events dedicated to said sequencer microprocessor including reacting to a write command, preparing to receive data, intersector handshake, and task file update;

such that said sequencer microprocessor executes said sequencer instructions to handle said plurality of real-time events so as to allow said sequencer to perform all operations required to transmit and receive multiple sectors of data to or from said host system promptly and without substantial intervention from said local microprocessor; and said program instruction set further programs said sequencer microprocessor to manage said task file register associated with said host bus so as to decouple said local microprocessor from real-time management of said addresses in said task file register.

27. A sequencer as claimed in claim 26, wherein said program instruction set enables said sequencer to handle non-time-critical events jointly with said local microprocessor, said non-time-critical events including certification of storage space in a disc cache available for said host system to write data into or read data from.

28. A sequencer as claimed in claim 27 wherein said intersector handshake includes controlling HIRQ and BSX signals in said task file register.

29. A sequencer as claimed in claim 26 wherein said program instruction set is stored on said disc drive and downloaded as needed by said sequencer microprocessor.

30. An ATA-compatible hard disc controller comprising a local microprocessor, and an ATA programmable sequencer comprising:

a sequencer microprocessor for interfacing, over a host bus, between an ATA host system including a host processor and a hard disc drive system including said controller and said local microprocessor;

one or more task file registers directly coupled to said sequencer microprocessor on a common substrate for holding information including addresses corresponding to locations on said hard disc drive where information is stored or retrieved;

a program instruction set for controlling operation of said sequencer microprocessor;

said program instruction set causing said sequencer microprocessor to control status in said task file register to update said task registers in time urgent specific phases, said sequencer performing intersector handshake at each sector boundary without intervention from said local microprocessor, status of a previous sector being posted before reading or writing a next sector; and wherein said program instruction set programs said sequencer microprocessor by dedicating a plurality of real-time events occurring on said host bus to be handled by said sequencer microprocessor means such that said local microprocessor is decoupled from said plurality of real-times events; and said program instruction set further programs said sequencer microprocessor to manage said task file register associated with said host bus so as to decouple said local microprocessor from real-time management of said addresses in said task file register.

31. A sequence as claimed in claim 30 wherein said task file registers are updated to indicate identify of a sector currently being transferred, and for indicating receipt of write data to said ATA host system.

32. A sequencer as claimed in claim 31 wherein said program instruction set is stored on said disc drive and downloaded as needed by said sequencer microprocessor.

33. The sequencer as in claim 31 Wherein said plurality of real-time events dedicated to said sequencer microprocessor includes:

reacting to a write command by setting a DRQ control signal;

preparing to receive data within 400 ns from command receipt;

intersector handshake; and task file update;

such that said sequencer microprocessor executes said sequencer instructions to handle said plurality of real-time events so as to allow said sequencer to perform all operations required to transmit and receive multiple sectors of data to or from said host system promptly and without substantial intervention from said local microprocessor.

34. A sequencer as claimed in claim 16 including means for storing a plurality of said instruction sets corresponding to various ATA host systems, whereby a plurality of different ATA hosts can be accommodated by said sequencer.

35. The sequencer as in claim 34 wherein said plurality of real-time events dedicated to said sequencer microprocessor includes:

reacting to a write command by setting a DRQ control signal;

preparing to receive data within 400 ns from command receipt;

intersector handshake; and task file update;

such that said sequencer microprocessor executes said sequencer instructions to handle said plurality of real-time events so as to allow said sequencer to perform all operations required to transmit and receive multiple sectors of data to or from said host system promptly and without substantial intervention from said local microprocessor.

36. The sequencer microprocessor as in claim 35 wherein said program instruction set programs said sequencer microprocessor by providing a plurality of sequencer instructions for execution by said sequencer microprocessor, causing said sequencer microprocessor to set and clear a plurality of control signals and flags, and to update said task file register, said sequencer microprocessor controlling overall logical control activities for reading and writing to said hard disc system, decoupling said local microprocessor from said control activities.

37. The sequencer microprocessor as in claim 36 further comprising a plurality of registers including at least a flag and control register and a rollover register, said flag and control register providing said sequencer microprocessor with said control signals and flags, said rollover register storing information allowing said sequencer microprocessor to update said task file register, such that said sequencer microprocessor executes said sequencer instructions through said plurality of registers to handle said plurality of real-time events and management of said task file register.

38. A sequencer as claimed in claim 34, wherein said program instruction set enables said sequencer to handle non-time-critical events jointly with said local microprocessor, said non-time-critical events including certification of storage space in a disc cache available for said host system to write data into or read data from.

39. A sequencer as claimed in claim 38 wherein said sequencer microprocessor is adapted to transmit a plurality of data sectors to or from said disc cache, utilizing an address supplied by said local microprocessor.

40. A sequencer as claimed in claim 39 including task file registers for storing buffer pointers instructing said sequencer whereto or wherefrom data is stored in said cache, said local microprocessor queuing up pointers in said task file registers.

* * * * *